United States Patent [19]

Maruta et al.

[11] 4,247,971

[45] Feb. 3, 1981

[54] PROCESS FOR STICKING CHEMICAL TO FIBROUS ARTICLE

[75] Inventors: Yoshio Maruta, Musashino; Minoru Hosoya, Tokyo, both of Japan

[73] Assignee: Kao Soap Co., Ltd., Tokyo, Japan

[21] Appl. No.: 58,121

[22] Filed: Jul. 16, 1979

[30] Foreign Application Priority Data

Jul. 14, 1978 [JP] Japan .................................. 53/86375

[51] Int. Cl.[3] ........................... B23P 17/06; B08B 1/00

[52] U.S. Cl. .................................... 29/4.5 B; 427/247; 427/422; 15/104.93; 29/527.2

[58] Field of Search ........................ 427/247, 421, 422; 252/91, 134; 15/104.93; 118/302; 29/4.5 B, 527.2

[56] References Cited

U.S. PATENT DOCUMENTS

| | | | |
|---|---|---|---|
| 2,240,135 | 4/1941 | Field et al. | 427/247 |
| 2,355,225 | 8/1944 | MacWilliam | 427/422 |
| 2,560,949 | 7/1951 | Harmon | 427/422 |
| 2,754,228 | 7/1956 | Bede | 427/422 |
| 3,042,547 | 7/1962 | Pickett | 427/422 |
| 3,073,721 | 1/1963 | Pokorny | 427/422 |
| 3,094,735 | 6/1963 | Hanlon | 15/104.93 |
| 3,337,465 | 8/1967 | Lancz | 252/91 |
| 3,338,742 | 8/1967 | Swain | 252/91 |
| 3,512,839 | 5/1970 | Jouffroy | 15/104.93 |
| 3,657,001 | 4/1972 | Parker | 427/422 |
| 3,929,535 | 9/1976 | Govindan | 427/422 |

*Primary Examiner*—Ronald H. Smith
*Assistant Examiner*—Richard Bueker
*Attorney, Agent, or Firm*—Blanchard, Flynn, Thiel, Boutell & Tanis

[57] ABSTRACT

Chemicals, such as soap, are stuck to fibrous articles, such as metallic wire, by injecting a high-temperature and high-pressure chemical solution into the fibrous article whereby flash evaporation of the solution's solvent effects a uniform distribution and adhesion of the chemical throughout the article.

3 Claims, 3 Drawing Figures

PROCESS FOR STICKING CHEMICAL TO FIBROUS ARTICLE

BACKGROUND OF THE INVENTION

1. Field of the Invention

The present invention relates to a process for sticking a chemical to a fibrous article, and the process of the present invention is characterized in that a high-temperature and high-pressure chemical solution is inserted into a fibrous article and flash evaporation of the solution's solvent effects a uniform distribution and adhesion of the chemical throughout the article.

2. Description of the Prior Art

As means for sticking a chemical to a fibrous article, there have heretofore been adopted a dipping process, a spraying process and a roller coating process. However, these processes are still insufficient in the attainment of uniform sticking when highly viscous chemicals (high concentration slurries) are used. For example, in the manufacture of a soap pad by sticking a soap to steel wool, if an aqueous solution of a soap is sprayed onto steel wool, the sprayed solution adheres only to the direct contact surface area according to the customary spraying process and the soap solution is not effectively distributed into in the center of the pad. Also in the dipping process, a large quantity of the soap often adheres to a limited area and it is very difficult to stick the soap in a uniform amount (small amount) throughout the the fibrous article. There is a process in which a diluted soap solution is sprayed or otherwise applied several times. However, this process is not advantageous because the drying and other steps consume time and the manufacturing cost is inevitably increased.

SUMMARY OF THE INVENTION

According to the present invention, a chemical solution is injected at a high temperature and a high pressure in a fibrous article. The solvent of the chemical solution injected in the fibrous article undergoes flash evaporation and the chemical is uniformly stuck to the fibrous article by the permeating force and latent heat of the generated vapor.

In the present invention, the chemical solution should be maintained at a high temperature and a high pressure. More specifically, the chemical solution should be maintained at a temperature higher than the boiling point of the solvent under atmospheric pressure. In case of an aqueous solution, the solution should be maintained at 110 to 200° C. and, in order to prevent vaporization before injection of the solution into a fibrous article, the pressure should be maintained at a level of 1.5 to 20 $Kg/cm^2$. Temperature and pressure conditions vary depending on the kind of the solvent used.

If the temperature is lower than 110° C., the amount of the vapor generated by flash evaporation is small, and no substantial effect or advantage over the ordinary spraying process is attained. Good results are obtained when the pressure is maintained at a level preventing vaporization of the chemical solution. However, if the pressure is lower than 1.5 $Kg/cm^2$, there is a risk that the extent of the flash evaporation after injection is insufficient. As the temperature and pressure are increased, the effect of uniform sticking of the chemical becomes more prominent in the present invention. However, if an excessive temperature and pressure are adopted, it is necessary to use a strong equipment, and some chemicals may be deteriorated.

DETAILED DESCRIPTION

An embodiment in which an aqueous solution of a soap is sprayed under high temperature and high pressure conditions into steel wool will now be described by reference to the accompanying drawings.

Figure 1:
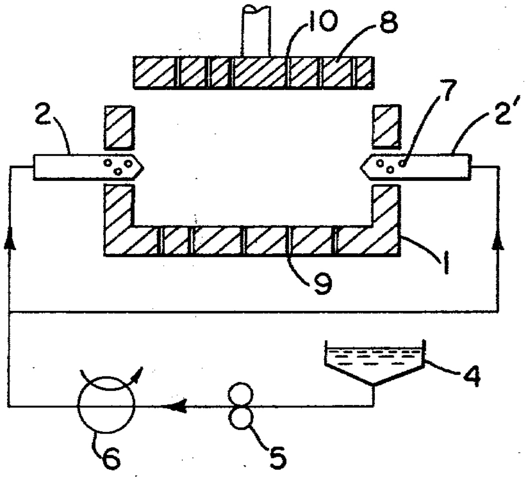
FIGS. 1 to 3 are sectional views showing on embodiment of the present invention.
Figure 2:
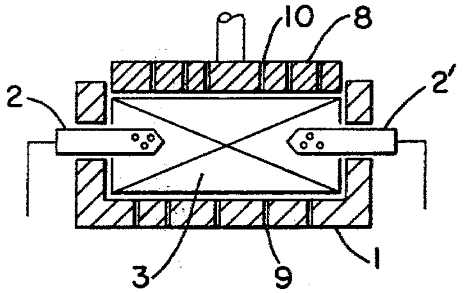
Figure 3:
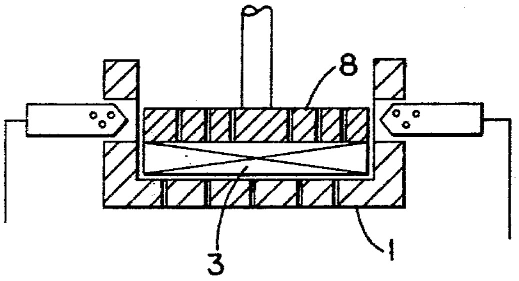

Spray nozzles 2 and 2' are slidably mounted on both the sides faces of a mold 1 such that the discharge ends of the nozzles extend into the mold, and roll-like steel wool 3 is placed in the mold. Fine holes 9 are formed through the mold to allow vapor to escape from the interior of the mold. A pressing plate 8 having fine holes 10 therethrough is disposed to press the steel wool. A predetermined amount of an aqueous solution of a soap stored in a tank 4 is taken out by a metering pump 5 and heated to about 150° C. by means of a heater 6. The solution is injected into the roll-like steel wool 3 under a pressure of about 6 $Kg/cm^2$ from the nozzles 2 and 2', effecting flash evaporation of the solvent therein. During this step, the discharge ends of the nozzles are inserted into the roll-like steel wool as shown in FIG. 2, and it is preferred that the solution be radially sprayed from a great number of small holes 7 formed in the top ends of the nozzles. After completion of the spraying operation, the nozzles 2 and 2' are taken out and the steel wool is compression-molded by the pressing plate 8 and heated and dried by the surface of the mold to obtain a steel wool molded article (soap pad) with soap uniformly adhering thereto. When the concentration of the aqueous soap solution (slurry) is adjusted to 50 to 70% by weight, the drying is accomplished in a very short time, and the drying step may be omitted in some cases.

In the drawings, valves and other control means have been omitted as they are not essential parts of the invention and would be obvious to one skilled in the art.

What is claimed is:

1. A process for impregnating steel wool with soap and forming the steel wool into a scouring pad, which comprises the steps of: placing a quantity of steel wool into the cavity of a mold, said mold having a vapor-pervious bottom wall, a vapor-pervious top wall and side walls, said top wall and said bottom wall being spaced apart so that said cavity is enlarged; extending injecting nozzle means into the central internal zone of said quantity of steel wool in said mold cavity and injecting through said nozzle means, into said quantity of steel wool, a stream of liquid aqueous soap composition containing from 50 to 70% by weight of soap, said composition being at a temperature of from 110° to 200° C. and under a pressure of from 1.5 to 20 $Kg/cm^2$ effective to prevent vaporization of the water contained in said composition until said composition enters said quantity of steel wool from said nozzle means so that when said liquid aqueous soap composition enters said quantity of steel wool, the water therein flash evaporates into steam and the steam flows to and through said vapor-pervious bottom and top walls and thereby the soap is carried by the steam and is deposited on the steel wool to form a substantially uniform distribution of said soap adhering to said quantity of steel wool; then removing said nozzle means from said quantity of steel wool; and then relatively moving said top wall and said bottom wall toward each other to compression mold said quantity of steel wool to form a scouring pad.

2. A process for impregnating steel wool with soap, which comprises the steps of: extending injecting nozzle means into the interior of a quantity of steel wool and injecting through said nozzle means, into said quantity of steel wool, a stream of liquid aqueous soap composition containing from 50 to 70% be weight of soap, said composition being at a temperature of from 110° to 200° C. and under a pressure of from 1.5 to 20 Kg/cm$^2$ effective to prevent vaporization of the water contained in said composition until said composition enters said quantity of steel wool from said nozzle means so that when liquid aqueous soap composition enters said quantity of steel wool the water therein flash evaporates into steam and the steam flows through said quantity of steel wool and thereby the soap is carried by the steam and is deposited on the steel wool to form a substantially uniform distribution of said soap adhering to said quantity of steel wool.

3. A process as claimed in claim 1 or claim 2 in which said nozzle means has a multiplicity of small, radialy extending holes for injecting said composition into said quantity of steel wool.

* * * * *